(12) United States Patent
Kopanski et al.

(10) Patent No.: US 10,722,003 B2
(45) Date of Patent: Jul. 28, 2020

(54) TOUCH FASTENER

(71) Applicant: Velcro BVBA, Deinze (BE)

(72) Inventors: Gregory K. Kopanski, Manchester, NH (US); Joshua W. Whitcomb, Raymond, NH (US)

(73) Assignee: Velcro BVBA, Deinze (BE)

( * ) Notice: Subject to any disclaimer, the term of this patent is extended or adjusted under 35 U.S.C. 154(b) by 0 days.

(21) Appl. No.: 15/730,812

(22) Filed: Oct. 12, 2017

(65) Prior Publication Data
US 2018/0140057 A1 May 24, 2018

Related U.S. Application Data

(60) Provisional application No. 62/425,691, filed on Nov. 23, 2016, provisional application No. 62/425,710, filed on Nov. 23, 2016.

(51) Int. Cl.
| | | |
|---|---|---|
| *A44B 18/00* | (2006.01) | |
| *B29C 65/00* | (2006.01) | |
| *B29C 65/02* | (2006.01) | |
| *B29C 65/78* | (2006.01) | |
| *B29L 31/00* | (2006.01) | |

(52) U.S. Cl.
CPC ...... *A44B 18/0015* (2013.01); *A44B 18/0065* (2013.01); *B29C 65/02* (2013.01); *B29C 65/7802* (2013.01); *B29C 66/69* (2013.01); *B29L 2031/729* (2013.01)

(58) Field of Classification Search
CPC . A44B 18/0015; A44B 18/0065; B29C 65/02; B29C 65/7802; B29C 66/69; B29L 2031/729
See application file for complete search history.

(56) References Cited

U.S. PATENT DOCUMENTS

| | | | | |
|---|---|---|---|---|
| 3,408,705 A | * | 11/1968 | Kayser | A44B 18/0065 24/446 |
| 3,860,469 A | | 1/1975 | Gregorian et al. | |
| 4,439,476 A | | 3/1984 | Guild | |
| 4,770,917 A | * | 9/1988 | Tochacek | A44B 18/0003 156/72 |

(Continued)

FOREIGN PATENT DOCUMENTS

| | | |
|---|---|---|
| EP | 2163166 | 3/2010 |
| FR | 2786372 | 6/2000 |
| WO | WO 2012/018879 | 2/2012 |

OTHER PUBLICATIONS

PCT International Preliminary Examining Authority and Written Opinion in International Application No. PCT/EP2017/078405, dated Oct. 22, 2018, 8 pages.

(Continued)

*Primary Examiner* — Robert Sandy
*Assistant Examiner* — David M Upchurch
(74) *Attorney, Agent, or Firm* — Fish & Richardson P.C.

(57) ABSTRACT

A touch fastener having long and thin headed stems welded to and extending from, for example, a thin film, is made by orienting thin, hollow, drawn staple fibers between bristles of a brush, with no more than fiber ends sticking out of the brush, and then fusing a film to the fiber ends by direct welding. The fibers are then withdrawn from the brush as stems that are headed by heating their ends and allowing the resin to reform into an engageable head.

16 Claims, 11 Drawing Sheets

(56) References Cited

U.S. PATENT DOCUMENTS

| | | | | |
|---|---|---|---|---|
| 5,671,512 A * | 9/1997 | Hattori | A44B 18/0049 24/452 |
| 5,797,170 A * | 8/1998 | Akeno | A44B 18/0053 24/442 |
| 6,162,040 A * | 12/2000 | Clune | A44B 18/0049 264/167 |
| 6,303,062 B1 * | 10/2001 | Aamodt | A44B 18/0049 264/167 |
| 7,465,366 B2 | 12/2008 | Provost et al. | |
| 8,663,409 B2 * | 3/2014 | Mueller | A44B 18/0061 156/298 |
| 8,961,850 B2 * | 2/2015 | Wood | A44B 18/0065 264/285 |
| 2002/0184927 A1 | 12/2002 | Polegato Moretti | |
| 2003/0033838 A1 | 2/2003 | Ikenaga et al. | |
| 2004/0261232 A1 | 12/2004 | Kurtz, Jr. et al. | |
| 2005/0217092 A1 | 10/2005 | Barker et al. | |
| 2010/0180407 A1 * | 7/2010 | Rocha | B29C 59/04 24/452 |
| 2014/0103567 A1 * | 4/2014 | Collins | B29C 43/222 264/167 |
| 2018/0140057 A1 | 5/2018 | Kopanski et al. | |
| 2018/0169923 A1 | 6/2018 | Whitcomb et al. | |

OTHER PUBLICATIONS

International Search Report and Written Opinion in International Application No. PCT/EP2017/083270, dated Mar. 6, 2018, 8 pages.

International Search Report and Written Opinion in International Application No. PCT/EP2017/078405, dated Feb. 2, 2018, 10 pages.

PCT International Preliminary Report on Patentability in International Application No. PCT/EP2017/078405, dated Feb. 11, 2019, 17 pages.

USPTO Office Action in U.S. Appl. No. 15/841,592, dated Dec. 12, 2019, 13 pages.

* cited by examiner

TOUCH FASTENER

TECHNICAL FIELD

This invention relates to touch fasteners, such as those with discrete male fastener elements configured to releasably engage a field of fibers, and to methods of forming such touch fasteners.

BACKGROUND

Touch fastener products have a field of small hooking members, also known as fastening elements, that can engage fibers, such as loops, to hold two things together. Early male touch fastener products were formed by weaving loops of drawn filament, stabilizing the filament loops and then cutting one side of each loop to form a hook. Later, methods of molding very small male fastening elements were developed, resulting in arrays of hooking members extending from a sheet of resin. Some male fastening elements are molded to have an engageable head at the end of a molded stem. For example, J-hooks and palm-tree style hooks may be molded in closed cavities, or formed by cutting and stretching an extruded rail. Some other male fastening elements are formed by molding straight stems extending from a sheet of resin, and then deforming the ends of the stems to form heads. Fastening elements with heads that overhang their stems on essentially all sides of the stem are called mushrooms or mushroom hooks. While molding hooks or precursor stems can be very cost-effective, there are practical limits to the shapes and sizes of features that can be readily molded at high speeds.

SUMMARY

According to one aspect of the invention, a touch fastener product has a base with a side surface, and a multiplicity of fastening elements extending from the side surface of the base. The fastening elements each have a non-tapered stem of resin extending from the side surface of the base to a head that overhangs sides of the stem for retaining fibers of a mating fastener product. The stems extend at different angles from the base and bases of the stems are secured to the side surface of the base at weld points in which resin of the stems is solidified in a weld with resin of the base side surface.

By extending at different angles, we mean that a longitudinal axis of one stem extends at one angle to the base, while the same longitudinal axis of another stem extends at a different angle, etc. In many cases, the stems extend from the base with a pseudo-random arrangement of angles and positions.

In some cases, the base side surface is formed by a resin film. In some examples, the film and stems are of similar thickness. The film may have a second side surface opposite the side surface to which the bases of the stems are secured, the second side surface being exposed on a back side of the base.

In some embodiments the product consists essentially of a film (as the base) and the fastening elements.

In some products, the heads overhang all sides of stems. The fastening elements of such products can be considered mushroom-type fastening elements.

In some embodiments, the stems are in the form of cylindrical tubes, or are otherwise hollow. In some examples, the heads define openings into the hollow stems.

In some cases, the stems have longitudinal seams extending along their length, such as extrusion seams. The heads in some such products have perimeters defining apices corresponding to the longitudinal seams of the stems. In some examples discussed below, the stems each have three extrusion seams and the heads have perimeters shaped as Reuleaux triangles.

In preferred embodiments the stems are very long and slender, having, for example, a length-to-thickness ratio of between 10 and 60 (or in some cases, between 20 and 50). For many fastening applications, the stems have a nominal stem length of at least 1.5 mm and/or a nominal thickness of less than about 0.2 mm. In some cases, the stems are of differing nominal thicknesses. For example, the stems may include one set of stems of relatively low thickness and another of relatively high thickness.

The stems may be of longitudinally drawn resin, which can help to facilitate the desired free formation of heads under proper conditions.

The stems may be of a pseudo-random distribution across the base. We discuss below what is meant by pseudo-random. The stems need not be each accurately positioned in order to form a useful fastening.

In some examples, some or all of the heads each have a bulb at a base of the head.

Another aspect of the invention features a touch fastener product with a base having a side surface, and a multiplicity of fastening elements extending from the side surface of the base. The fastening elements each have a non-tapered stem of resin extending from the side surface of the base to a head that overhangs the base for retaining fibers of a mating fastener product. The stems have length (measured along the stem from the side surface of the base to an underside of the head) and overall lateral thickness (measured perpendicular to the stem) and a length to thickness ratio of between 10 and 60 (in some cases, between 20 and 50). Bases of the stems are secured to the side surface of the base at weld points in which resin of the stems is solidified in a weld with resin of the base.

In some cases, the base side surface is formed by a resin film. In some examples, the film and stems are of similar thickness. The film may have a second side surface opposite the side surface to which the bases of the stems are secured, the second side surface being exposed on a back side of the base.

In some embodiments the product consists essentially of a film (as the base) and the fastening elements.

In some products, the heads overhang all sides of stems. The fastening elements of such products can be considered mushroom-type fastening elements.

In some embodiments, the stems are in the form of cylindrical tubes, or are otherwise hollow. In some examples, the heads define openings into the hollow stems.

In some cases, the stems have longitudinal seams extending along their length, such as extrusion seams. The heads in some such products have perimeters defining apices corresponding to the longitudinal seams of the stems. In some examples discussed below, the stems each have three extrusion seams and the heads have perimeters shaped as Reuleaux triangles.

For many fastening applications, the stems have a nominal stem length of at least 1.5 mm and/or a nominal thickness of less than about 0.2 mm. In some cases, the stems are of differing nominal thicknesses. For example, the stems may include one set of stems of relatively low thickness and another of relatively high thickness.

The stems may be of longitudinally drawn resin, which can help to facilitate the desired free formation of heads under proper conditions.

The stems may be of a pseudo-random distribution across the base. We discuss below what is meant by pseudo-random. The stems need not be each accurately positioned in order to form a useful fastening.

In some examples, some or all of the heads each have a bulb at a base of the head.

Another aspect of the invention features a method of making a fastener product. The method includes orienting a number of extruded resin fibers in a common direction, with an end of each fiber exposed and positioned within a distance of a common datum (the distance preferably being less than 20 percent of an average length of the fibers). The exposed ends of the fibers are engaged with a side of a carrier sheet extending normal to the common direction, and the engaged ends of the fibers are permanently secured to the carrier sheet by welding resin of the fibers to resin of the carrier sheet. Engageable heads are formed on ends of the fibers opposite the secured ends.

In some embodiments the carrier sheet comprises a film forming the side of the carrier sheet, or essentially consists of such a film.

In some cases, permanently securing the engaged ends of the fibers to the carrier sheet forms welds extending beyond sides of the fibers, such that the welds have a lateral extent, at the side of the resin film, at least twice a nominal thickness of the secured fibers.

In some examples, permanently securing the engaged ends of the fibers forms holes in the carrier sheet or film.

As described below, in some examples orienting the extruded resin fibers involves holding the fibers between and parallel to bristles of a brush, with the exposed ends of the fibers extending to at or beyond distal ends of the brush bristles. The datum may be a plane spaced a determined distance from the distal ends of the brush bristles. Orienting the fibers may include needling the fibers into the brush and may include, before needling the fibers, supporting the fibers on the distal ends of the brush bristles as an incoherent batt of staple fibers. Orienting the fibers may involve, after needling the fibers, removing unoriented fibers from the brush while holding the oriented fibers between the brush bristles.

Orienting the fibers may involve, while holding the fibers between and parallel to the brush bristles, pressing the exposed ends of the fibers toward the brush to position the exposed ends with respect to the datum.

In some cases, the brush bristles have a free length to thickness ratio of between 10 and 100. In this respect, 'free length' is the overall length of the bristle from where it is secured in the brush body to its free end. Ideally, the brush bristles are sufficiently densely packed that the oriented fibers are held in their oriented position by adjacent bristles.

The method is preferably performed as a continuous process, the brush being in the form of a recirculating belt that moves sequentially through a fiber laying station, a needling station, a securing station, a product removing station, and a brush cleaning station in which unsecured fibers are removed from between the brush bristles before the belt returns to the fiber laying station.

In some embodiments, engaging the exposed ends of the fibers involves supporting the carrier sheet on the exposed ends while the fibers are held between the brush bristles.

In some examples, permanently securing the engaged ends of the fibers to the carrier sheet involves heating the engaged ends of the fibers with heat applied through the carrier sheet, or heating the exposed ends of the fibers before engaging the exposed ends of the fibers with the side of the carrier sheet.

In some cases, forming the engageable heads involves heating the distal ends to cause resin of the distal ends to deform into heads that overhang sides of the fibers. The distal ends may be heated with a non-contact heat source, for example. The heads may be formed such that the head defines an overhang about its entire perimeter.

In some applications, the extruded resin fibers are hollow and the engageable heads, as formed, define openings into the hollow fibers. Forming the engageable heads may include heating the distal ends of the hollow fibers to cause resin of the distal ends to roll outwardly and downwardly to overhang the fibers.

In some examples, the extruded resin fibers each have one or more extrusion seams extending longitudinally along the fiber, and the formed engageable heads have perimeters defining a number of perimeter apices corresponding to a quantity of the extrusion seams of the fibers. For example, the extruded resin fibers may each have three extrusion seams, with the head perimeters each defining three perimeter apices.

The openings defined by the engageable heads of hollow fibers may also define a number of opening apices corresponding to the quantity of the extrusion seams of the fibers.

In some applications of the method, the fibers are of different thicknesses and forming the engageable heads includes forming relatively larger heads on relatively thicker fibers, and forming relatively smaller heads on relatively thinner fibers.

For many applications the fibers, as oriented, are straight, uncrimped, staple fibers of length between 4 and 10 mm. The staple fibers may have a nominal thickness of between 50 and 250 microns, and/or a length to thickness ratio of between 10 and 60 (or between 20 and 50).

For some applications, the carrier sheet (or film) has a nominal thickness between 0.3 and 2.5 times a nominal thickness of the fibers.

According to another aspect of the invention, a touch fastener product has a base with a side surface, and a multiplicity of fastening elements extending from the side surface of the base. The fastening elements each have a tubular stem having one end fixed to the base and extending to a distal end spaced from the base (the tubular stem being hollow over at least a majority of its length), and a head formed at the distal end of the tubular stem, the head overhanging the base for retaining fibers of a mating fastener product. The tubular stems each have one or more extrusion seams extending longitudinally along the stem, and the heads have perimeters defining a number of apices corresponding to a quantity of the extrusion seams of the stems.

In some cases, the base side surface is formed by a resin film. In some examples, the film and stems are of similar thickness. The film may have a second side surface opposite the side surface to which the bases of the stems are secured, the second side surface being exposed on a back side of the base.

In some embodiments, the product consists essentially of a film (as the base) and the fastening elements.

In some products, the heads overhang all sides of stems. The fastening elements of such products can be considered mushroom-type fastening elements.

In some examples, the stems each have three extrusion seams, and in some cases, the head perimeters are shaped as Reuleaux triangles.

In some examples, the heads define openings into the hollow stems.

In preferred embodiments, the stems are very long and slender, having, for example, a length-to-thickness ratio of between 10 and 60 (or in some cases, between 20 and 50). For many fastening applications, the stems have a nominal stem length of at least 1.5 mm and/or a nominal thickness of less than about 0.2 mm. In some cases, the stems are of differing nominal thicknesses. For example, the stems may include one set of stems of relatively low thickness and another of relatively high thickness.

The stems may be of a pseudo-random distribution across the base. We discuss below what is meant by pseudo-random. The stems need not be each accurately positioned in order to form a useful fastening.

In some examples, some or all of the heads each have a bulb at a base of the head.

Another aspect of the invention features a method of making a fastener product, including orienting a number of extruded resin fibers in a common direction, and engaging an exposed end of each fiber with a side of a resin sheet extending normal to the common direction. The engaged ends of the fibers are permanently secured to the resin sheet by welding resin of the fibers to resin of the sheet. Engageable heads are formed on ends of the fibers opposite the secured ends.

In some embodiments, the resin sheet comprises a film forming the side of the sheet, or essentially consists of such a film, or is a film.

In some cases, permanently securing the engaged ends of the fibers to the resin sheet forms welds extending beyond sides of the fibers, such that the welds have a lateral extent, at the side of the resin film, at least twice a nominal thickness of the secured fibers.

In some examples, permanently securing the engaged ends of the fibers forms holes in the resin sheet or film.

As described below, in some examples orienting the extruded hollow resin fibers comprises holding the fibers between and parallel to bristles of a brush, with the exposed ends of the fibers extending at or beyond distal ends of the brush bristles and positioned within a distance of a common datum, the distance being less than 20 percent of an average length of the fibers. The datum may be a plane spaced a determined distance from the distal ends of the brush bristles. Orienting the extruded hollow resin fibers may include needling the fibers into the brush and may include, before needling the fibers, supporting the fibers on the distal ends of the brush bristles as an incoherent batt of staple fibers. Orienting the extruded hollow resin fibers may involve, after needling the fibers, removing unoriented fibers from the brush while holding the oriented fibers between the brush bristles.

Orienting the extruded hollow resin fibers may involve, while holding the fibers between and parallel to the brush bristles, pressing the exposed ends of the fibers toward the brush to position the exposed ends with respect to the datum.

In some cases, the brush bristles have a free length to thickness ratio of between 10 and 100. In this respect, 'free length' is the overall length of the bristle from where it is secured in the brush body to its free end. Ideally, the brush bristles are sufficiently densely packed that the oriented fibers are held in their oriented position by adjacent bristles.

The method is preferably performed as a continuous process, the brush being in the form of a recirculating belt that moves sequentially through a fiber laying station, a needling station, a securing station, a product removing station, and a brush cleaning station in which unsecured fibers are removed from between the brush bristles before the belt returns to the fiber laying station.

In some embodiments, engaging the exposed ends of the fibers involves supporting the carrier sheet on the exposed ends while the fibers are held between the brush bristles.

In some examples, permanently securing the engaged ends of the fibers to the carrier sheet involves heating the engaged ends of the fibers with heat applied through the carrier sheet, or heating the exposed ends of the fibers before engaging the exposed ends of the fibers with the side of the carrier sheet.

In some cases, forming the engageable heads involves heating the distal ends to cause resin of the distal ends to deform into heads that overhang sides of the fibers. The distal ends may be heated with a non-contact heat source, for example. The heads may be formed such that the head defines an overhang about its entire perimeter.

In some applications, the engageable heads, as formed, define openings into the hollow fibers. Forming the engageable heads may include heating the distal ends of the hollow fibers to cause resin of the distal ends to roll outwardly and downwardly to overhang the fibers.

In some examples, the extruded resin fibers each have one or more extrusion seams extending longitudinally along the fiber, and the formed engageable heads have perimeters defining a number of perimeter apices corresponding to a quantity of the extrusion seams of the fibers. For example, the extruded resin fibers may each have three extrusion seams, with the head perimeters each defining three perimeter apices. Where the engageable heads define openings into the hollow fibers, the openings defined by the engageable heads may define a number of opening apices corresponding to the quantity of the extrusion seams of the fibers.

In some applications of the method, the fibers are of different thicknesses and forming the engageable heads includes forming relatively larger heads on relatively thicker fibers, and forming relatively smaller heads on relatively thinner fibers.

For many applications, the fibers, as oriented, are straight, uncrimped, staple fibers of length between 4 and 10 mm. The staple fibers may have a nominal thickness of between 50 and 250 microns, and/or a length to thickness ratio of between 10 and 60 (or between 20 and 50).

For some applications, the sheet (or film) has a nominal thickness between 0.3 and 2.5 times a nominal thickness of the fibers.

The methods taught herein may be employed to make particularly thin and flexible fastener elements able to penetrate into dense fiber layers and flex to retain engaged fibers. The manufacturing method may be performed at high speeds to produce a product that is very material-efficient, and may be readily adapted to make touch fastener products of different properties. The methods tend to produce fields of touch fastener elements having a desirable variability in height and direction, and can be practiced to form stable connections between staple stem fibers and an inexpensive carrier film, for example, by direct welding rather than requiring a separate adhesive material. The methods, and resulting structures, are also not subject to many of the limitations of high speed molding or extrusion.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
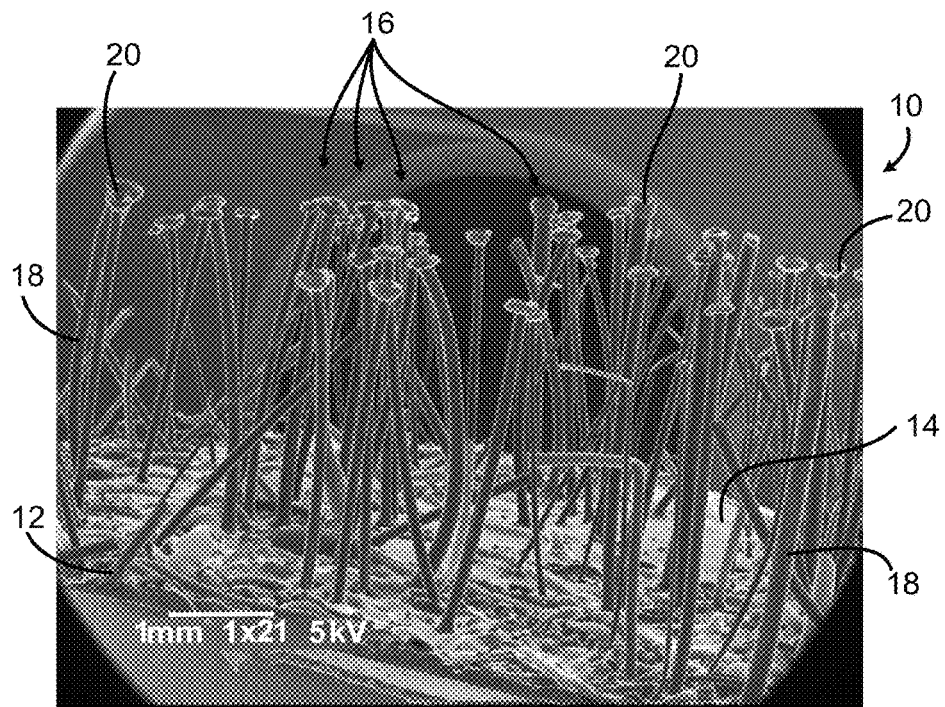
FIG. 1 is a microphotograph of a first touch fastener product.

Referring first to FIG. 1, a touch fastener product 10 has a base 12 with a side surface 14 formed by a resin film. A multiplicity of fastening elements 16 extend from the side surface of the base, each having a non-tapered stem 18 of resin extending from the side surface of the base to a head 20 that overhangs sides of the stem, for retaining fibers of a mating fastener product (not shown). The side surface 14 of the base in this example has a non-smooth topography, but other examples have smoother topography, as shown in other figures. As seen in this figure, the stems 18 extend generally perpendicularly to the base, in that they are predominantly upright. However, the stems extend at different angles, with some essentially vertical and others leaning, and still others with noticeable bends. As will be discussed in more detail below, the stems have a particularly high length to thickness ratio, meaning that they are relatively tall and slender, and are of generally constant cross-section, meaning that the cross-section of the stem stays generally constant over its length and not, for example, tapering in thickness. Heads 20 are generally disk-shaped, overhanging all sides of their associated stems, but are not of identical size and shape. As will be evident in this photo, the stems are not arranged in an ordered pattern or array, but are of a pseudo-random distribution. By 'pseudo-random' we mean that the distribution is apparently random to visual observation. This does not preclude slight patterning as a residual effect of patterning, such as by needling, but distinguishes structural patterning such as weave or knit patterns or repetitive molding patterns.

Figure 2:
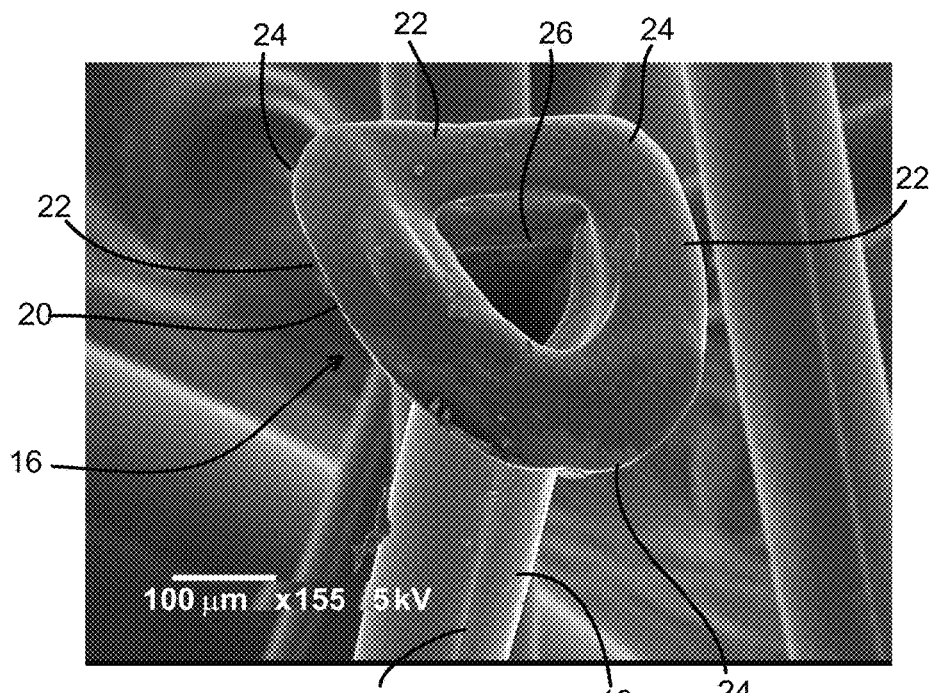
FIG. 2 is an enlarged perspective view of a fastener element head.
Figure 2A:
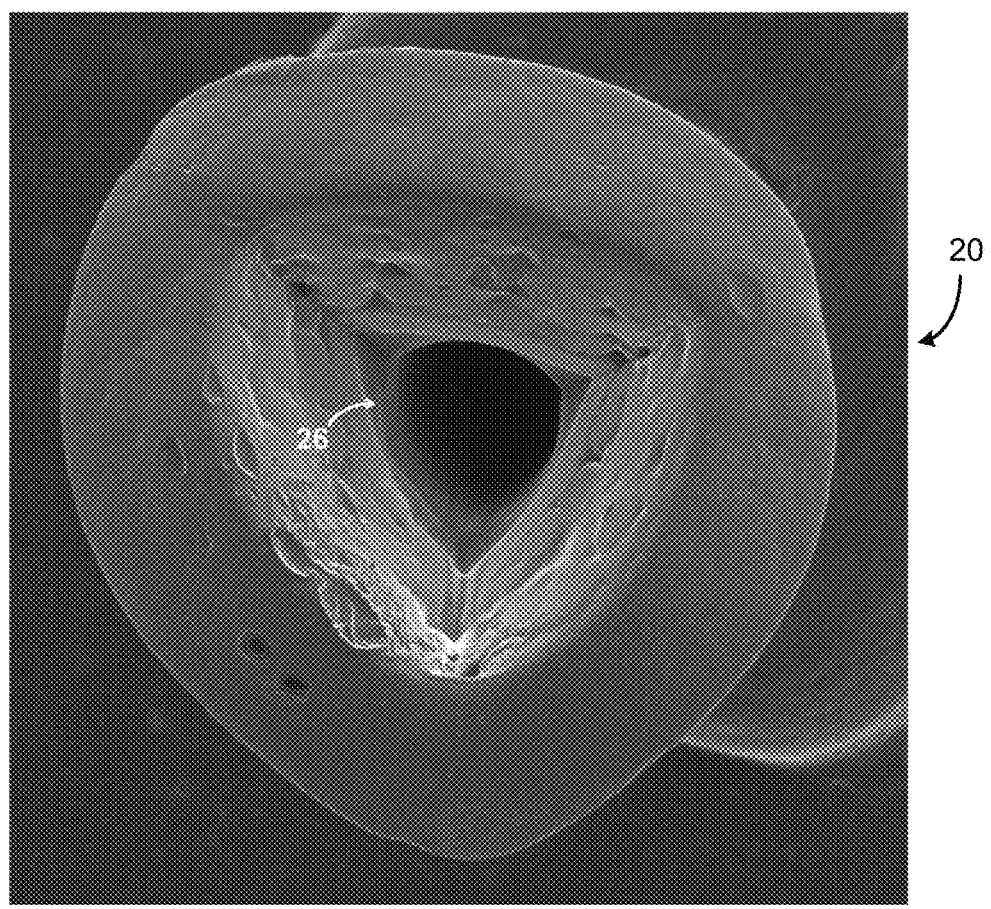
FIG. 2A is an enlarged top view of a fastener element head.

Referring also to FIG. 2, a typical head 20 has an outer shape approximating a Reuleaux triangle, with three generally curved sides 22 joined at three generally equidistant curved apices 24. The upper (outer) surface of the head is gently curved and convex about a central aperture 26 open to the interior of the stem 18, which is hollow. Another example of a head 20 is shown in FIG. 2A, in which the shape of the central aperture 26 is more evident, as is the outer shape of the overall head. In this example, the overall width of the head, for size reference, is about 0.5 mm, or about 2.5 times the thickness of the underlying stem.

Figure 3:
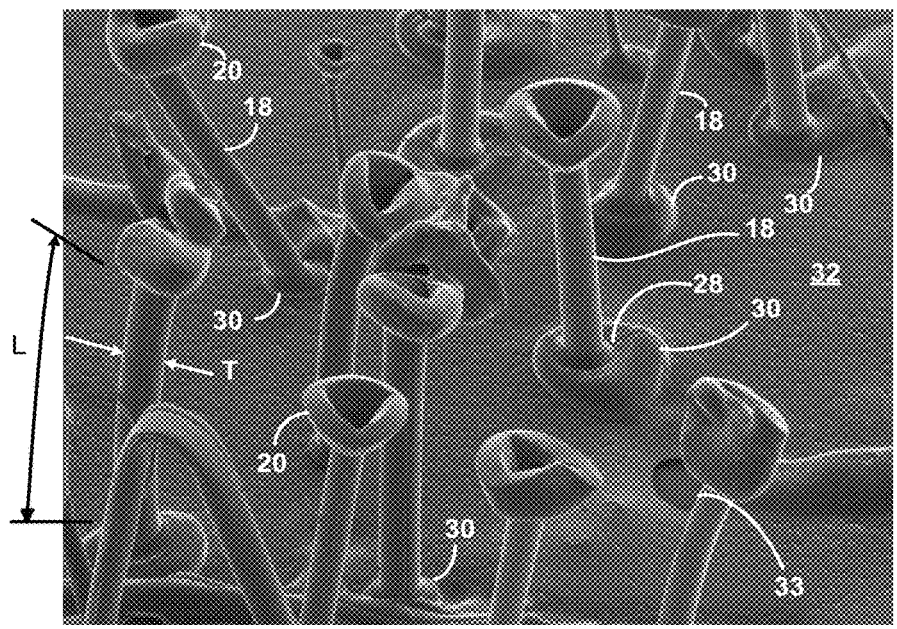
FIG. 3 is a microphotograph of a second touch fastener product.
Figure 3A:
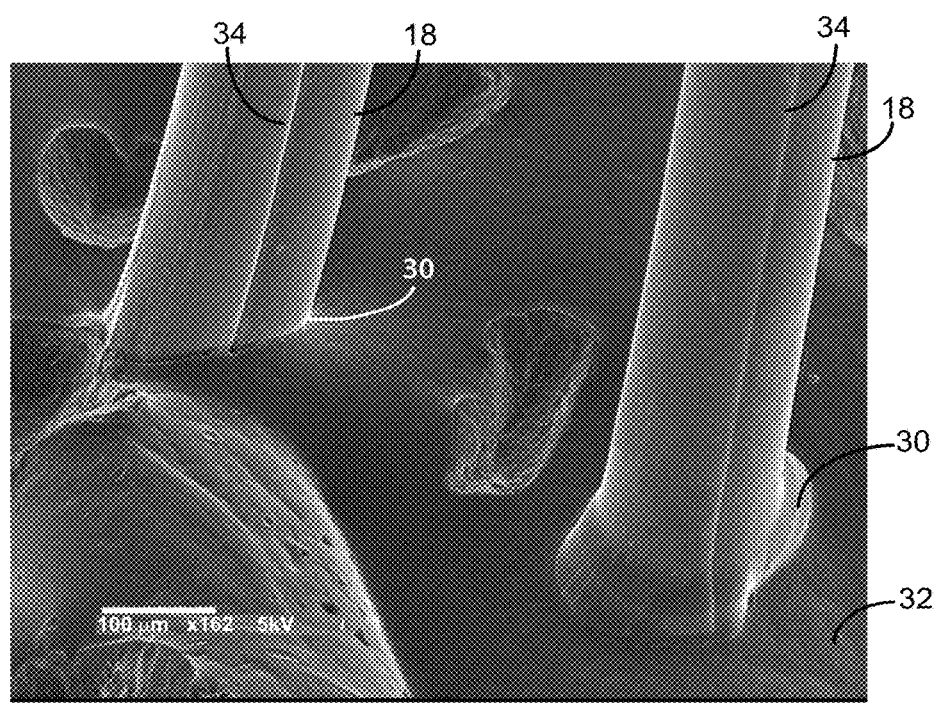
FIG. 3A is an enlarged view of the bases of two fastener elements.

Referring next to FIG. 3, the stems 18 have bases 28 that are secured to the side surface of the film at weld points 30 in which resin of each stem is solidified in a weld with resin of the film 32. How this welding is accomplished with such thin stems and thin film is discussed in more detail below. In many instances the weld is in the form of a solidified puddle of resin disposed above the generally planar film surface, as seen in FIG. 3. In other instances the weld forms less of a discrete puddle above the film, as in the example shown in FIG. 3A. The stems each have a length 'L', measured along the stem from the side surface of the base to an underside of the head, and an overall lateral thickness 'T', measured perpendicular to the stem. In many cases, such as the example illustrated in FIG. 1, the stems have a length to thickness ratio (L/T) of at least 10, or between 10 and 60. The stems shown in FIG. 1, for example, have a typical length of about 4.2 mm and a nominal thickness of about 0.15 mm, resulting in an L/T ratio of around 30. FIG. 3 also shows that in some cases, holes 33 may be formed in the film during the formation of the product.

Figure 4:
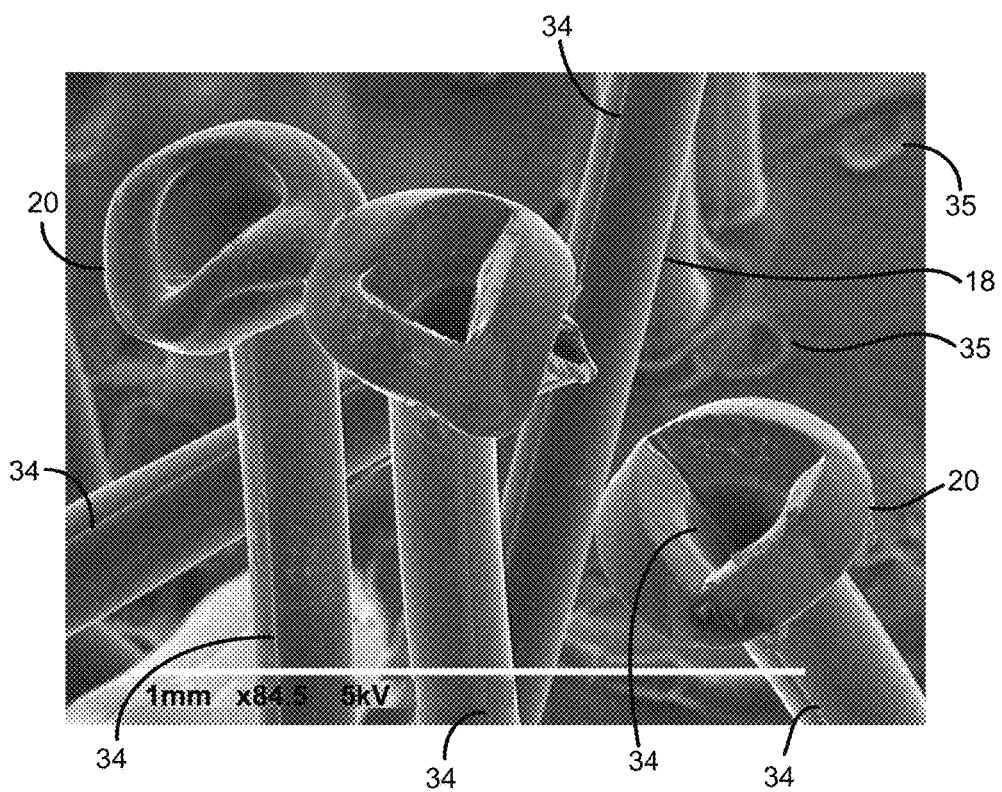
FIG. 4 is an enlarged perspective view of a group of fastener elements.

Referring next to FIG. 4, each stem 18 is tubular and hollow over a majority of its length, with a generally cylindrical outer surface. However, the tubular stems each have extrusion seams 34 extending longitudinally along the stem. In the examples shown in FIGS. 2-4, the stems each have three generally equidistant seams 34, and the number of seams is believed to be determinative of the number of sides and apices of the resulting heads 20, with the number of apices corresponding to the number of seams. This is evident, for example, in FIG. 2A, in which the three seams 34 are visible at corresponding corners formed in the central aperture 26 of the head. These seams 34 and corresponding aperture corners are circumferentially aligned with the three apices of the head. As will be discussed below, the free-form formation of the heads from resin of the seamed stems is believed to account for this phenomenon.

Figure 5:
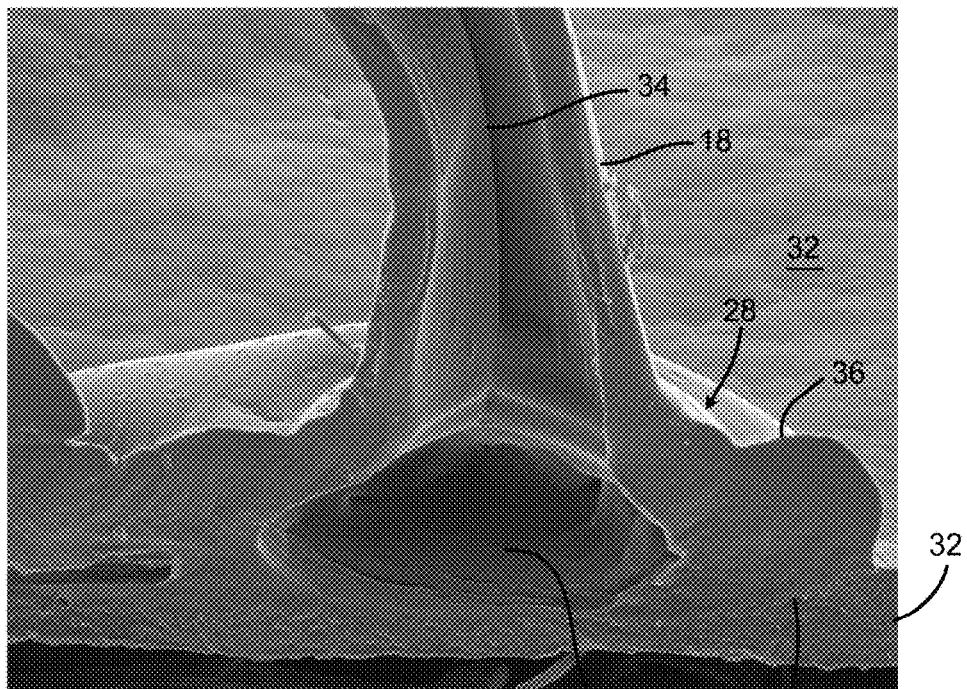
FIG. 5 is a microphotograph of a fastener element base, as severed along a plane perpendicular to the film.

That the seams 34 extend along the entire length of stems 18 is evident from the section through a stem 18 shown in FIG. 5. Also evident is the formation of the weld puddle 36 at the base 28 of the stem. In this instance a cavity 38 developed within the weld puddle, open to the interior of the hollow stem. The weld line 40 between the stem resin and the film resin is also evident in this photograph, as well as that the nominal film thickness in this case is less than the overall thickness of the stem. The slight splaying of the bottom end of the stem, and the expanded puddling of the stem resin are believed to result from the base end of the stem being subjected to a nominal columnar load during the welding process.

Figure 6:
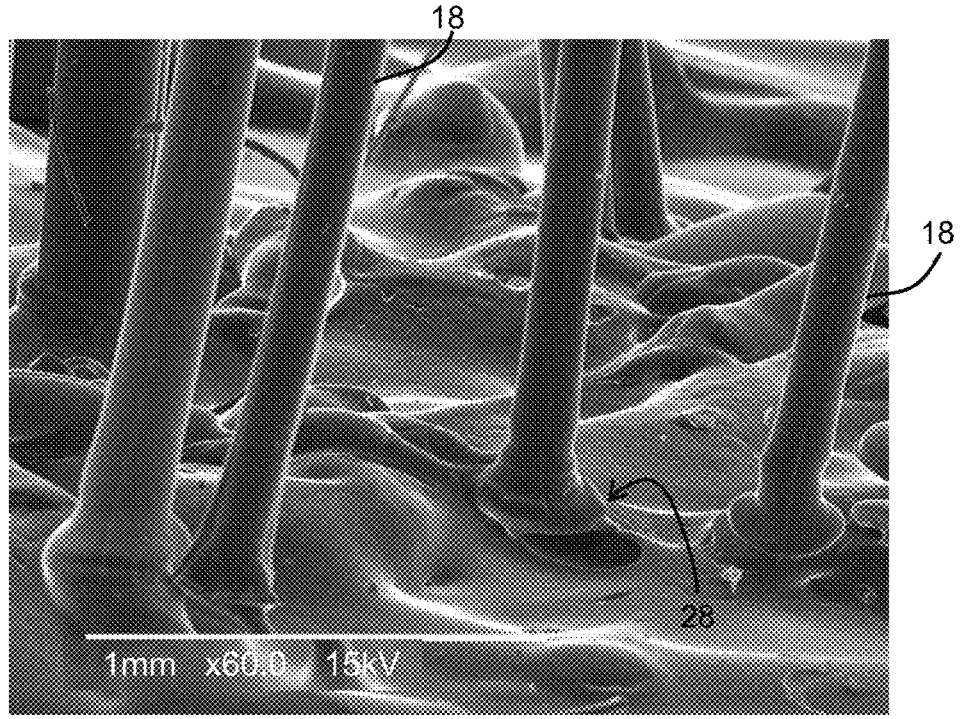
FIG. 6 is an enlarged view of the film surface, including several fastener element bases.

Referring also to FIG. 6, the expansion of the base end of the stem, combined with the weld puddling, we have come to refer to as the 'elephant foot' effect. This can also be called a 'melt buckling' effect, the result of which is to produce a base 28 having an expanded footprint on the film, for increased weld area and better securement of the stems to the film. Evidence of the melt buckling can be seen in the slight diameter fluctuations at some of the stem bases. As seen in FIGS. 5 and 6, at least many of the welds produced at the bases of the stems have a lateral extent, at the side of the resin film, of at least twice the nominal thickness of the stems themselves.

Figure 7:
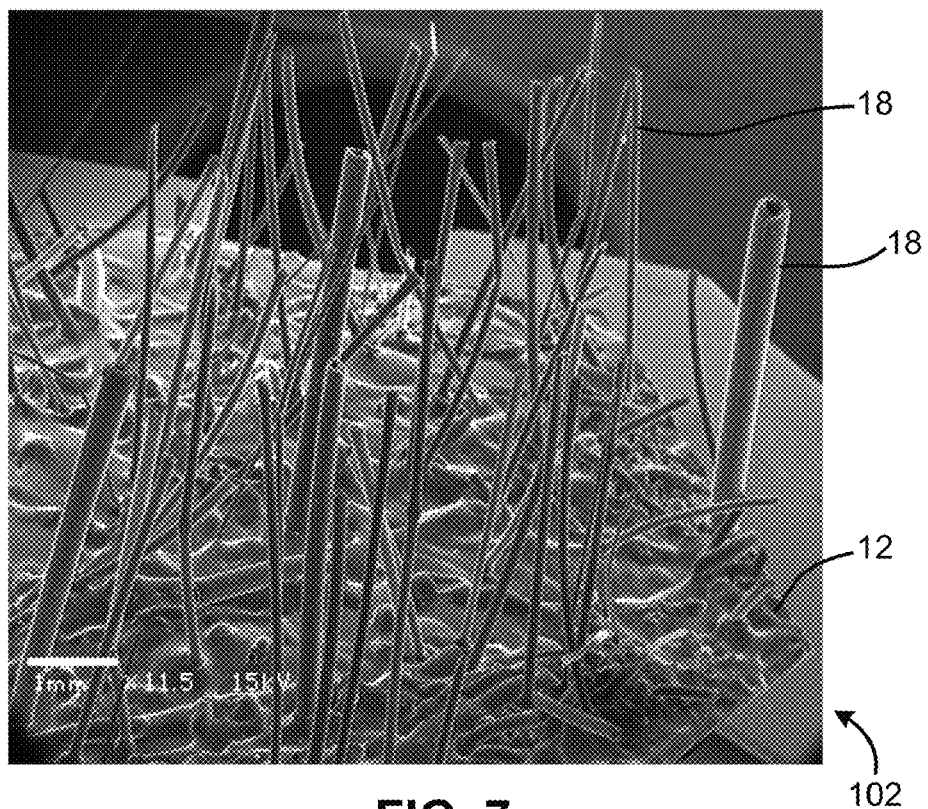
FIG. 7 is a microphotograph of a precursor product, prior to formation of fastener element heads.
Figure 8:
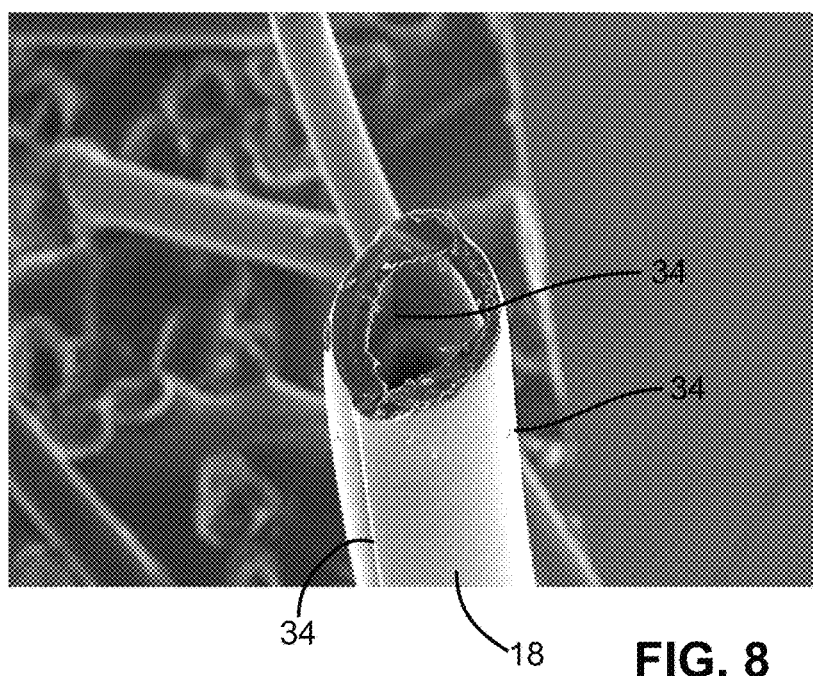
FIG. 8 is an enlarged perspective view of a distal end of a fiber of the product of FIG. 7.

Referring next to FIGS. 7 and 8, before the heads are formed, stems 18 of this example have straight distal ends and are generally of the overall shape of drinking straws. As evident in FIG. 7, these stems may be of different diameters. At least many extend to a similar, although not identical, height from base 12. The topography of the base is affected by portions of stems that have melted into the surface of the film as a result of the manufacturing process, described below. This example was produced needling fibers into a brush having bristles substantially longer than the staple fibers—in this case needling 6 mm fibers into a 20 mm deep brush.

Figure 9:
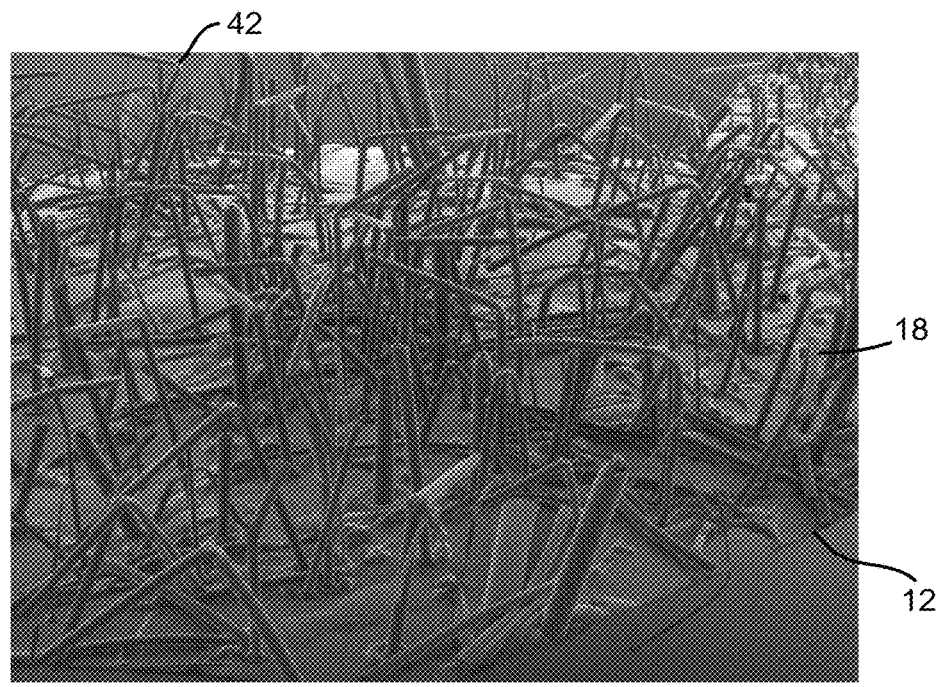
FIG. 9 is a microphotograph of a precursor product with bent fibers.
Figure 10:
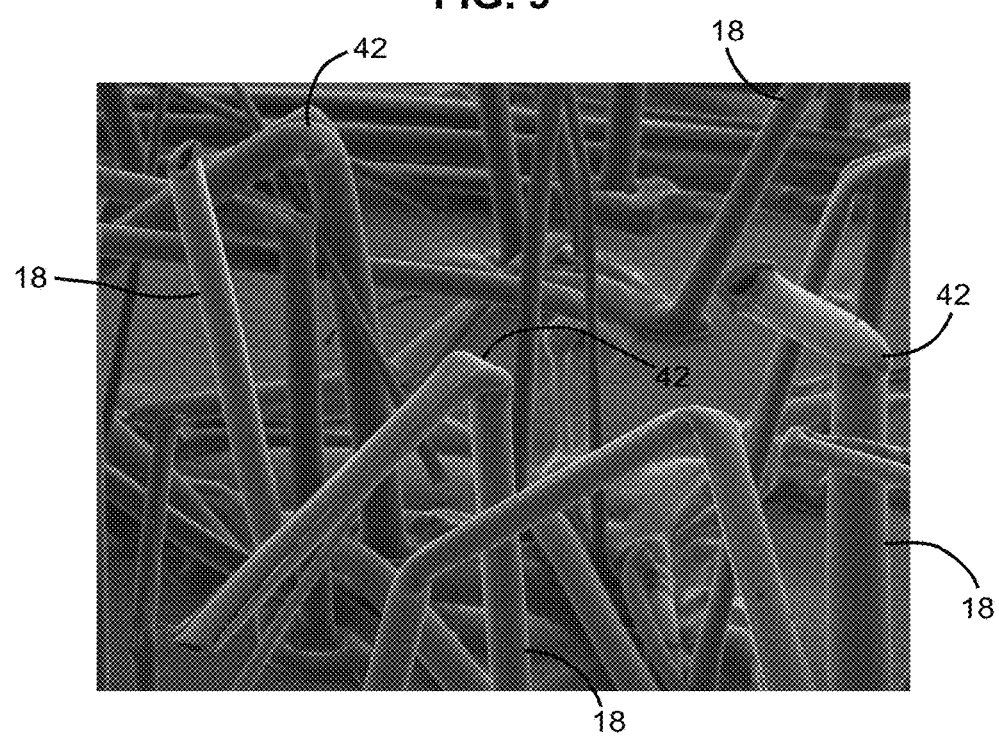
FIG. 10 is an enlarged view of the product of FIG. 9.

As seen in FIGS. 9 and 10, in some instances many of the precursor stems each have a defined and discrete bend, with the bends located at a generally common distance from the base. In many cases the bent stems are straight other than at the single bend, often near a midpoint of the length of the stem. As will be described below, the heading process can be conducted in many instances such that bent precursor stems are straightened in the process of forming the heads. These images are provided to illustrate that in many cases it is not necessary for the precursor stems to be straight prior to heading, to form straight headed fastener elements. This example was produced needling fibers into a brush having a bristle bed only about as deep as the length of the stable fibers—in this case, needling 6 mm fibers into a brush of only 6 mm long bristles. In other words, useful product was produced even needling fibers in such a way that the fiber did not align vertically over substantially its entire length within the brush before fusing to a backing.

Figure 11:
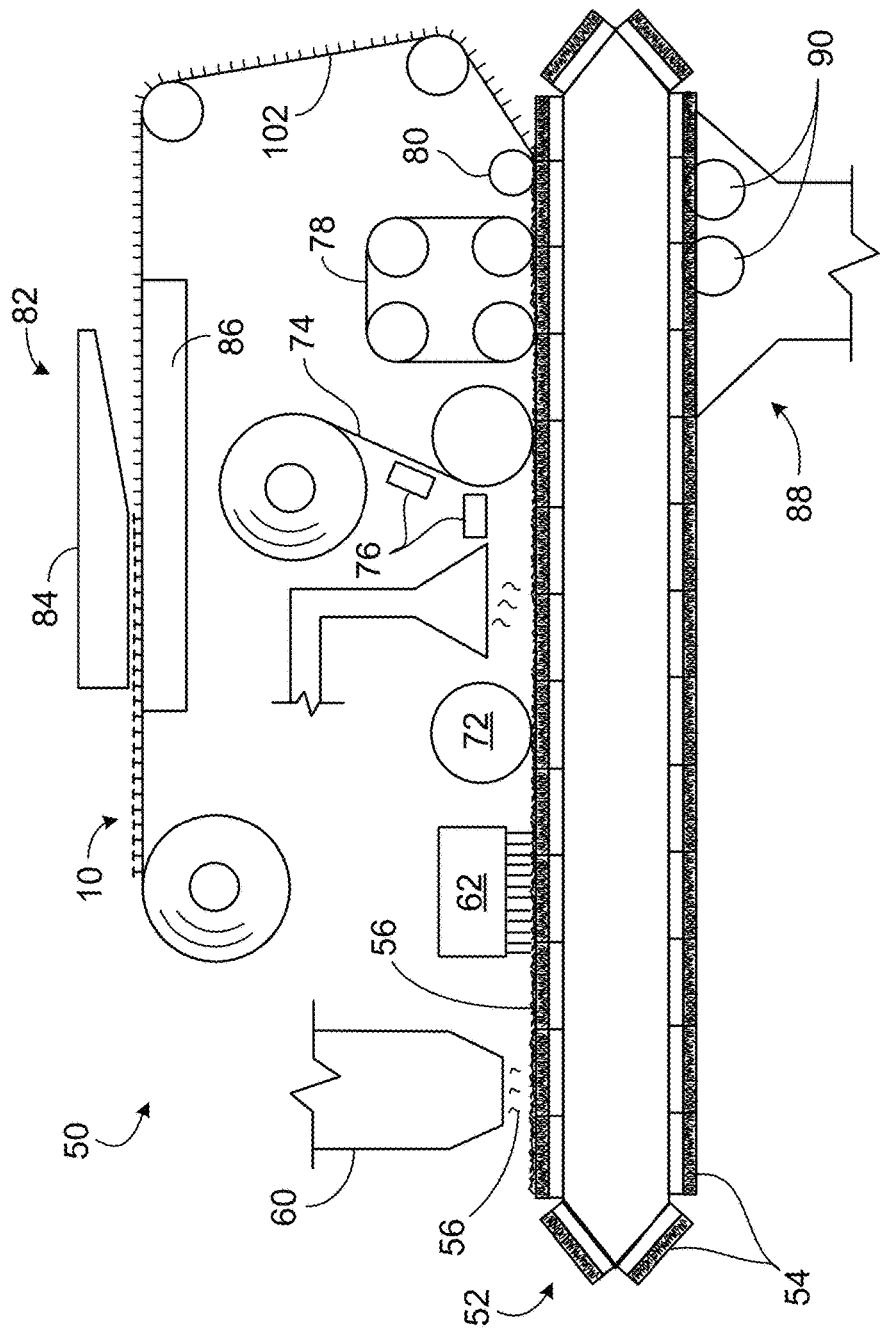
FIG. 11 illustrates a machine and process for forming touch fastener products.

Referring next to FIG. 11, a machine 50 and process for producing the fastener product of the above-described figures features a continually moving brush apron 52 comprised of rigid brush segments 54 linked to form a continuous loop. Each segment carries a dense bed of upstanding flexible bristles extending from a rigid base. As shown, brush apron 52 is maintained to travel at a constant line speed along a linear path through various stations of the manufacturing process. In some embodiments, brush apron 52 has a nominal bristle density of about 2500 bristles per square inch (about 380 bristles per square centimeter). The bristles are each about 0.008 inch (0.2 millimeter) in diameter and about 6 millimeters long (although 20 mm long bristles have also been successfully used), with rounded tips. The bristles used to produce the products illustrated above are crimped, with a crimp period of about 5 mm and a crimp amplitude of about 0.5 mm. The bristles may be formed of any suitable material, for example 6/12 nylon. Suitable brushes may be purchased commercially and retrofitted onto supporting links. Generally, the brush apron moves at the desired line speed.

Beginning at the lower left end of FIG. 11, a loose batt 56 of staple fibers 58 is air laid on the brush apron, such as from an air chute 60. The fibers, as laid on the velour brush apron, are randomly distributed and randomly oriented and form a batt of only about 200 grams per square meter (gsm). The staple fibers are uncrimped, hollow fibers, each having a nominal length of only about 6 mm, and are completely disconnected and loose in the batt. The batt 56 has virtually no strength or coherence in any direction because the fibers are not entangled or otherwise tethered. Thus, the batt is an "incoherent" layer of staple fibers, having little to no dimensional stability in any direction, and will pull apart under its own weight if attempted to be lifted from the brush apron at this stage.

In some embodiments, suitable fibers 58 are drawn and uncrimped fibers, 40 to 200 denier, of about 4 mm to 10 mm staple length, preferably hollow. For the example shown in FIG. 1, polypropylene 70 dtex hollow fibers, cut to 6 mm length, were obtained from IFG Asota of Linz, Austria, as an uncrimped variant of their product G40B2, cut to a 6 mm staple length. Such fibers are believed to be extruded from spinnerets having multiple curved orifices separated by thin walls, such that extrudate from the adjacent orifices join immediately after or during extrusion to form the seams. In the case of the stems shown in FIGS. 2-4, for example, each spinneret would have three arc-shaped nozzle openings arranged in a circle. Envisioned modifications to alter the resulting structure of the fiber (which becomes the stems in the fastener product) include altering the distance between adjacent nozzle openings, or altering the number of openings spaced about the perimeter to change the number of resulting seams. The shapes of the orifices may also be altered to create a fiber (stem) of non-circular outer circumference, or a different inner surface configuration, both to change the structural properties of the stems and to create different head shapes. Various synthetic fiber materials may be employed, understanding that formation of the heads is affected by the amount of residual draw or longitudinal strain in the fibers as laid on the brush apron. It may even be advantageous to use bicomponent fibers, either of one resin sheathed with a second resin or of alternating longitudinal segments of two resins, either solid or hollow. The fibers 58 may be of different thicknesses or otherwise of different construction, but preferably all of the fibers are of drawn resin suitable for head formation, as discussed below, for efficient use of materials.

Stem fibers with tenacity values, measured in accordance with test method ISO 5079, of at least 5 cN/tex are preferable, and fibers with a tenacity of at least 10 or more cN/tex (preferably even 15 or more cN/tex) are even more preferred in many instances. In general terms, the higher the fiber tenacity, the stronger the fastener element stem. For many applications, particularly products where the hook-and-loop components will be engaged and disengaged more than once ("cycled"), it is desirable that the stems have relatively high strength so that they do not break when the fastener product is disengaged. Widespread stem breakage can deleteriously effect re-engagement of the fastener.

Referring again to FIG. 11, fiber batt 56, in its incoherent state, is carried by brush apron 52 into a needling station 62, where the batt of fibers is repeatedly needle-punched. The needles may be guided through a stripper plate above the fibers, and draw fibers of the batt deep into the brush apron on the other side. During needling, batt 56 is supported directly on the bristles of brush apron 52 (as shown in FIGS. 12A-12D), which moves with the fibers through needling station 62. In some embodiments, needling station 62 needles the batt with an overall penetration density of about 80 to 320 punches per square centimeter, using forked needles 68. In a particular example, needle beams are fitted with needle boards having a density of 7500 needles/meter. In this example, the needle loom was fitted with 36 gauge, 2.5 inch needles and cycled with a stroke frequency of 2100 strokes per minute.

Figure 12A:
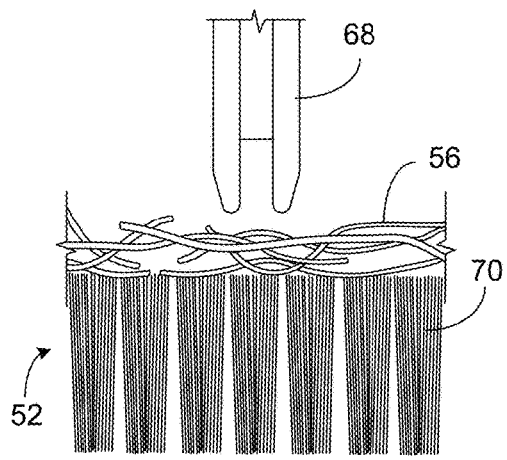
FIGS. 12A-12D sequentially illustrate needling staple fibers into a brush.
Figure 12B:
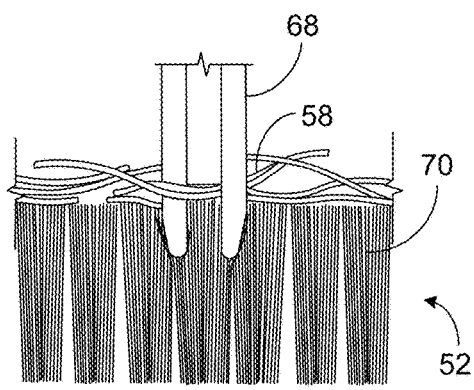
Figure 12C:
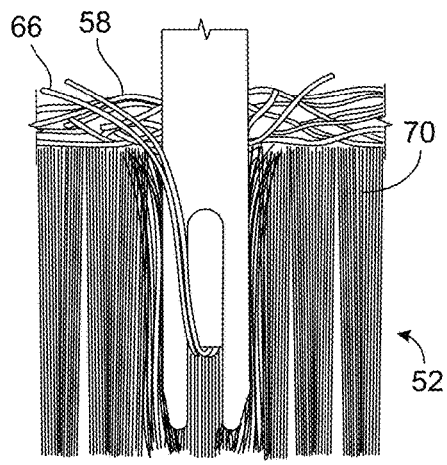

FIGS. 12A through 12D sequentially illustrate the displacement of fibers deep into the brush apron by the needling process. Initially, the loose batt 56 of fibers is conveyed to the needling station by brush apron 52, with the individual fibers 58 of the batt carried directly on a bed of brush bristles 70 (FIG. 12A). As a fork needle 68 enters the batt (FIG. 12B), some individual fibers 58 will be captured in the cavity between the leading prongs of the forked end of the needle. As needle 68 "punches" into the brush, these captured fibers 58 are drawn down with the needle into the bed of bristles 70. As shown, the remainder of the batt remains generally supported on brush apron 52 through this process. Thus, the penetrating needle 68 laterally displaces local brush bristles 70 as it intrudes upon brush apron 52. As needle 68 continues to penetrate (FIG. 12C) through brush bristles 70, the captured fibers 58 are drawn deep into the brush and out of the batt. In this example, a total penetration depth of up to about 4 millimeters, as measured from the top surface of brush apron 52, was found to draw most of the captured fiber into the brush, leaving only exposed fiber ends, either extending from, or level with, the top surface of the brush. We have found that the needling depth can be somewhat greater than the staple fiber length and still produce useful product. When needle 68 is retracted from the bristle bed (FIG. 12D), the captured fibers 58 carried into the brush bristles 50 remain in place with an essentially vertical orientation between the bristles. It should be understood that other needle types may be used; for example, felting needles or crown needles.

Where necessary, an elliptical needling technique (such as described in U.S. Pat. No. 7,465,366 the entirety of which is incorporated herein by reference), or similar, can be used to reduce or eliminate relative movement between the batt and the penetrating needles.

For needling longitudinally discontinuous regions of the material, such as to create discrete regions of fastening elements, the needle boards can be populated with needles only in discrete regions, and the needling action paused while the material is indexed through the loom between adjacent loop regions. Effective pausing of the needling action can be accomplished by altering the penetration depth of the needles during needling, including to needling depths at which the needles do not penetrate the batt. Such needle looms are available from Autefa Solutions in Austria, for example. Alternatively, means can be implemented to selectively activate smaller banks of needles within the loom according to a control sequence that causes the banks to be activated only when and where fastener elements are desired. Lanes of fastener elements can be formed by a needle loom with lanes of needles separated by wide, needle-free lanes.

Figure 12D:
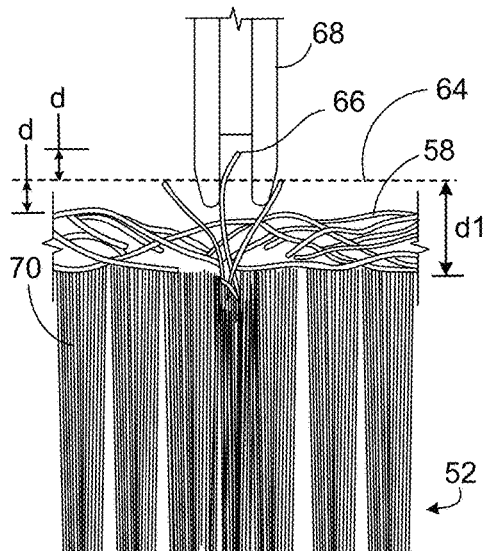

Thus, unlike typical needling processes in which the purpose and function of the needling is to entangle fibers within the batt, or to form discrete loops of fiber extending into the brush while leaving ends of the fibers on top of the brush, this needling process drives a significant portion (generally, about 25 percent or more) of the fiber into the brush, leaving ends of individual fibers extending upward from between the brush bristles 70. As illustrated in FIG. 12D, as a result of the needling fibers are left oriented in the vertical direction (normal to the batt), with at least one end 66 of each fiber exposed and positioned within a distance 'd' of datum 64. Preferably, the distance 'd' is less than 20 percent of the average or nominal length of the staple fibers. For example, for 6 mm staple fibers, the needling results in many fiber ends 64 being within 1 mm of a common datum above the surface of the brush. The result of the needling is that the nominal distance d1 that the fiber ends extend from the brush (represented by datum 64) is in some cases about 2 mm, such that the majority of each of the embedded fibers is primarily between the brush bristles 70. Prior to vacuuming the remaining fibers from the surface, the exposed ends may be difficult to see.

Referring back to FIG. 11, after needling the exposed ends of the needled fibers may be processed by a roller 72 that helps to further normalize the distance to which the fiber ends extend above the brush surface, further diminishing the distance d1 that datum 64 for is above the brush (see FIG. 12D). In some cases, after adjustment by roller 72, datum elevation d1 is only about 0.3 mm, or even zero. As an alternative to roller 72, a flat plate or flat belt laminator can be used to press the fibers further into the brush. After roller 72, any loose (excess) fibers are vacuumed from the brush surface, leaving essentially only those fibers that have been oriented vertically within the brush, generally with exposed ends extending a nominal distance (d1, FIG. 12D) from the brush. For example, of the 200 gsm of fibers initially forming the batt prior to needling, vacuuming may remove 140 gsm of fiber, with another 10 gsm of fiber subsequently removed from the brush after removal of the product—meaning that only ¼ of the original fiber mass (or 50 gsm, in this case) is incorporated into the final product. A film 74 is then introduced to the exposed fiber ends (and to the tops of the bristles if the fibers have been depressed to be fully within the brush) and the film fused to the exposed ends of the fibers. Immediately before introduction of the film, either or both of the film surface and the fiber ends are softened by heat from a radiant heater 76. Immediately after the film is introduced, pressure is applied to the fiber ends through the film, such as by a pressure belt 78 that travels with the brush apron to apply a desired, non-sliding pressure to the film for a desired dwell time, to effect the fusing. Belt 78 may be heated, such that heat is applied by the belt, through the film, to the fiber ends, either additionally, or as an alternative, to preheating the fiber ends and/or film. In any case, it is a combination of heat and pressure over time that causes the ends of the fibers to weld to the film. Belt 78 may be equipped with multiple sequential heating and cooling zones to affect different heating conditions as needed to effect the desired bonding, depending on thicknesses, speeds and materials, such as is taught in U.S. Ser. No. 14/725,420, filed May 29, 2015, the contents of which are incorporated herein by reference. However, formation of the products shown in FIGS. 1-4 required only a single pressure/heating cycle, using a heating plate of temperature of about 400 degrees F., pressed against the back of the film with a pressure of about 0.09 psi and held in place for about 1 second. As noted above, in some cases holes (see hole 33 in FIG. 3) are formed in the film during processing, typically during the fusing of the film to the fibers. In some cases, the film can partially fuse also to tips of the bristles, such that when the film is later removed small amounts of film material are removed from the surface, leaving divots or craters (such as craters 35 seen in FIG. 4). Such craters are not found to have any detrimental effect on the performance of the fastener product. Cratering may be reduced by lowering pressure and/or temperature of the fusing process, or by coating the bristle tips.

Film 74 may be, for example, a 45 gsm, 0.05 mm thick film, such as of polypropylene if working with polypropylene fibers. Preferably the film and fibers are of the same base resin, to promote welding. We have found that this process can successfully fuse fiber ends to film even when the film is of the same thickness as, or even thinner than, the rather thin fibers. In the fusing process, there is evidence of melting of both the film and the fiber at the weld points.

Following fusing, the precursor fastener product 102 (film and fused fibers) is removed from brush apron 52 via tension applied by a stripper roll 80, which pulls the oriented fibers from the bed brush bristles. Removed from brush apron 52, the precursor product has a base formed predominantly of film but incorporating random portions of fiber that had remained on the brush surface, and a bunch of fibers fused to, and extending from, the base as shown in FIGS. 7-10. This precursor product is next transported to a heading station 82 featuring a heated platen 84 that applies radiant heat to the stem side of the product as it travels past the platen against a support 86, forming engageable heads on the distal ends of the fibers. As an alternative to a platen, a hot wire or hot knife may be employed, but as described below, the heating time and temperature can be varied by an appropriately shaped and positioned platen, to control the heading process. To produce the products shown in FIGS. 2-4, for example, a 1000 degree F. hot knife, in the form of a foam cutter with a 15 cm blade, was moved past the product at a speed of about 2.5 cm/sec, just above the stems.

After heading, the fastener product 10 can be spooled or otherwise processed, such as by direct lamination to a product surface, such as a non-woven diaper chassis. In some cases, the film forming the base of the product remains non-porous to form a substantially impermeable product that can be subsequently processed using vacuum transport. Other materials can be bonded to the film, either as the fibers are fused or in a subsequent lamination process. Examples of such materials include other films, such as elastomeric or stretchable films, non-woven materials, and paper.

In some cases, a material other than film can be used to form the base of the product. For example, a light non-woven material can be fused onto the exposed fiber ends to form a porous base from which the stems extend. In another example, the loose fibers of the batt are left on the brush surface and fused together (and to the exposed fiber ends) to form the product base.

After the precursor product has been stripped from the brush apron, the brush segments are cleaned of any remain fiber at a cleaning station 88, in which hook rolls 90 agitate the brush surface in the presence of a cleaning air flow. Removed fibers may be recycled into the process.

The heading process at heading station 82 takes advantage of the residual stresses in the extruded or spun fibers forming the stems. As the stems approach (but preferably never touch) the heated platen surface, a first noticed effect is that fibers with a residual bend (such as those shown in FIGS. 9 and 10) tend to straighten at the bend and stand more generally erect, as strain at the bend is relieved. Next, the distal ends of the fibers or stems begin to deform. The deformation appears to progress as a rolling of the stem material outward and downward, such as one might imagine the rolling of an upper end of a sock down a leg, for example. This rolling motion appears to stabilize the head shape as the roll occurs about the entire circumference rather uniformly. The longer the heat is applied, the farther the fiber rolls down and the larger the head becomes. The greater the fiber draw or elongation, the more the head forms with a consistent, disk-like shape, while fibers without significant draw tend to form rounder heads. The hollow fiber form can facilitate a faster and more uniform rolling, and it is believed that the apices forming in the head at the seams tend to help promote the width of the forming head, resulting in a structure suitable for releasable engagement of loops or other fibers. The heading process can also significantly shorten the stems, beyond the shortening necessarily occasioning the rolling of the heads themselves, as residual stresses in the stems are relaxed.

Figure 13:
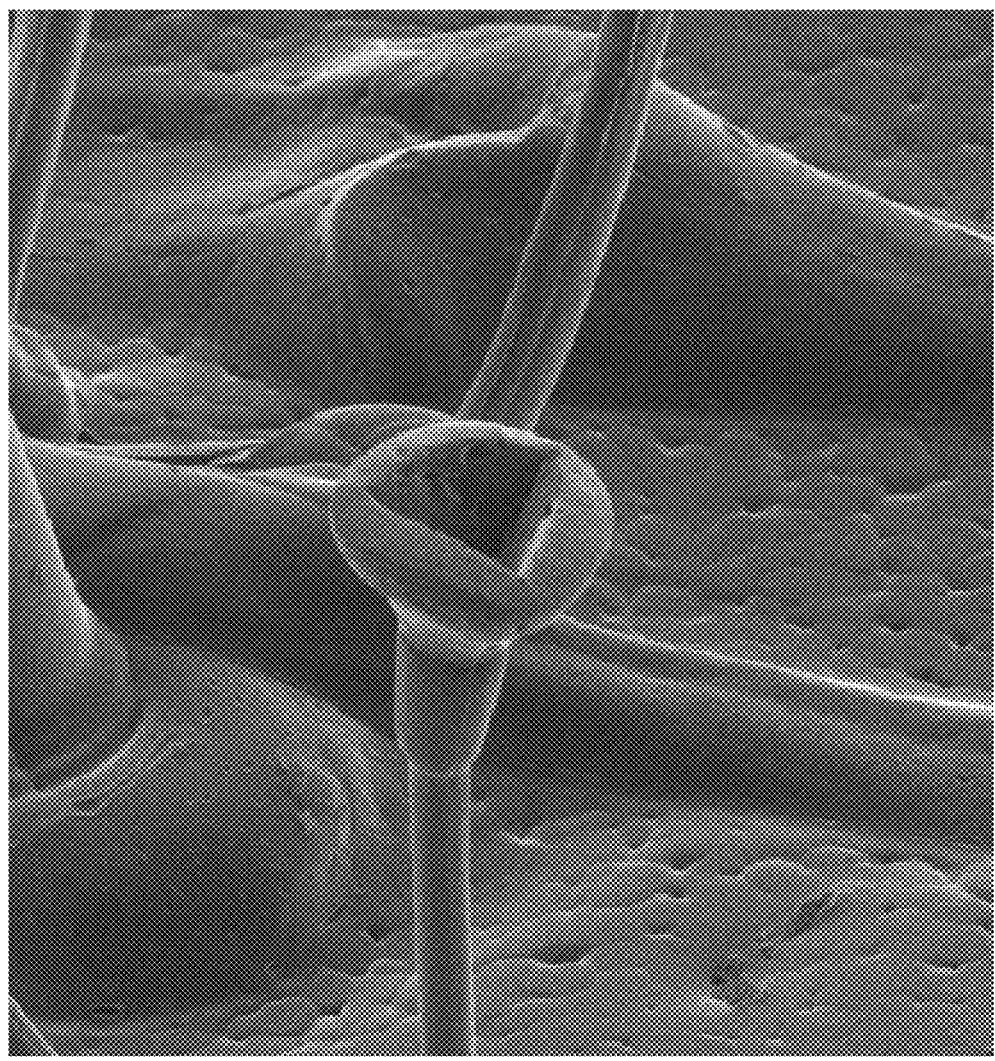
FIG. 13 is an enlarged view of a fastener element head and underlying bulb.

It should be noted that the heading process can be controlled to produce a variety of different engageable head shapes, and that due to the varied positioning and nature of the stems there will be a range of head sizes and shapes across any given product. And as noted, the stems may be of different thicknesses, producing correspondingly different head sizes and melting/rolling at different rates. We have noted that, for example, longer application of heat can cause a swelling of the stems immediately below the heads, producing what can best be described as a bulb at the base of the head, as shown in FIG. 13. This effect can be optimized for improved stem/head connection strength and stiffness, for example. Direct flame or hot air heating may be used as an alternative to a heated surface, if properly controlled.

Figure 14:
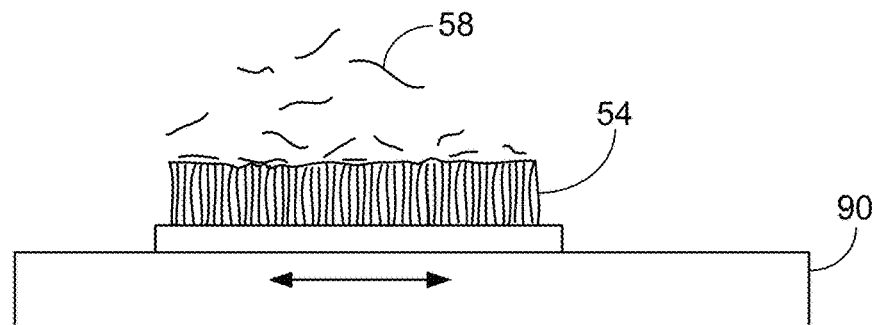
FIG. 14 shows shaking fibers into a brush.
Figure 15:
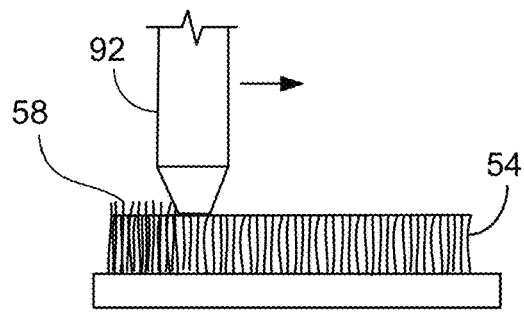
FIG. 15 shows injecting fibers into a brush.
Figure 16:
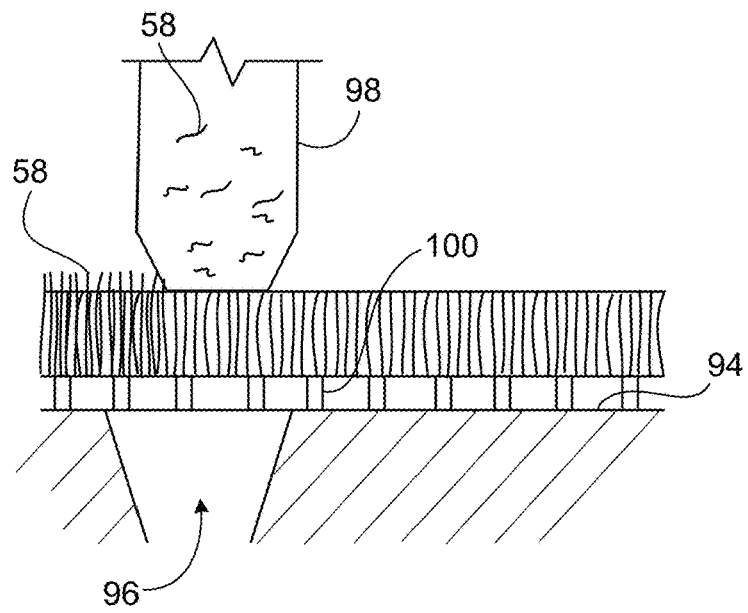
FIG. 16 shows drawing fibers into a brush.

Regarding the initial positioning/orientation of fibers in the brush, deep between the bristles, other methods may be employed as an alternative to needling. For example, FIG. 14 conceptually illustrates motivating discrete staple fibers into a brush segment 54 using vibration applied to the brush segment by a shaker table 90 that vibrates the brush segment laterally as the fibers are introduced to the surface of the brush. By selecting a vibration frequency in connection with the structural properties of the brush bristles, transient openings may be formed between bristles in order to receive fibers that penetrate farther into the brush and become vertically oriented between bristles as a result of the vibration. FIG. 15 conceptually illustrates ejecting fibers into the brush by means of a pneumatic nozzle 92 that orients the fibers vertically and drives them into the brush as the nozzle moves across the brush surface. The nozzle tip may be configured to engage and separate the bristle tips to facilitate fiber injection. The nozzle is connected both to a source of pressurized air flow and to a source of fibers, such that the fibers are entrained in a flow of air introduced to the nozzle. FIG. 16 conceptually illustrates pulling discrete staple fibers into a brush segment supported on a vacuum table 94. As the brush segment moves across the table under a hopper 98 of loose fibers (or other fiber source) aligned with a vacuum port 96 in the table, air is drawn from the hopper, between the brush bristles, through apertures in the base of the brush segment, and into the vacuum port 96, carrying fibers 58 from the hopper into the brush and orienting them vertically between the bristles. The lower end of hopper 98 may be configured to splay the bristles as the brush passes beneath, facilitating fiber placement.

The fastening product examples described above were confirmed to engage with some commercial fastener loop material, to resist both peel and shear load as engaged, and to disengage without substantial damage.

While a number of examples have been described for illustration purposes, the foregoing description is not intended to limit the scope of the invention, which is defined by the scope of the appended claims. There are and will be other examples and modifications within the scope of the following claims.

What is claimed is:

1. A touch fastener product comprising
   a base having a side surface comprising resin; and
   a multiplicity of fastening elements extending from the side surface of the base, the fastening elements each having a non-tapered stem of resin extending from the side surface of the base to a head that overhangs sides of the non-tapered stem for retaining fibers of a mating fastener product;

wherein the non-tapered stems extend at different angles from the base; and wherein bases of the non-tapered stems are secured to the side surface of the base at weld points in which resin of the non-tapered stems is solidified in a weld with resin of the base side surface.

2. The touch fastener product of claim 1, wherein the base side surface comprises a resin film.

3. The touch fastener product of claim 2, wherein the film and non-tapered stems are of similar thickness.

4. The touch fastener product of claim 1, wherein the non-tapered stems are in the form of cylindrical tubes.

5. The touch fastener product of claim 1, wherein the non-tapered stems are hollow.

6. The touch fastener product of claim 5, wherein the non-tapered stems have longitudinal seams extending along their length.

7. The touch fastener product of claim 6, wherein the heads have perimeters defining apices corresponding to the longitudinal seams of the non-tapered stems.

8. The touch fastener product of claim 6, wherein the non-tapered stems each have three extrusion seams and heads have perimeters shaped as Reuleaux triangles.

9. The touch fastener product of any of claims 5, wherein the heads define openings into the hollow non-tapered stems.

10. The touch fastener product of claim 1, wherein the non-tapered stems have a nominal thickness of less than about 0.2 mm.

11. A touch fastener product comprising
a base having a side surface; and
a multiplicity of fastening elements extending from the side surface of the base, the fastening elements each having:
a tubular stem having one end fixed to the base and extending to a distal end spaced from the base, the tubular stem being hollow over a majority of its length; and
a head formed at the distal end of the tubular stem, the head overhanging the base for retaining fibers of a mating fastener product;
wherein the tubular stems each have one or more extrusion seams extending longitudinally along the tubular stem; and
wherein the heads have perimeters defining a number of apices corresponding to a quantity of the extrusion seams of the tubular stems.

12. The touch fastener product of claim 11, wherein the film has a second side surface opposite the side surface to which the tubular stems are secured, the second side surface being exposed on a back side of the base.

13. The touch fastener product of claim 11, wherein the tubular stems each have three extrusion seams.

14. The touch fastener product of claim 11, wherein the heads define openings into the tubular, hollow stems.

15. The touch fastener product of claim 11, wherein the tubular stems are of different nominal thicknesses.

16. The touch fastener product of claim 11, wherein the tubular stems are of a pseudo-random distribution across the base.

* * * * *